United States Patent Office 3,217,656
Patented Nov. 16, 1965

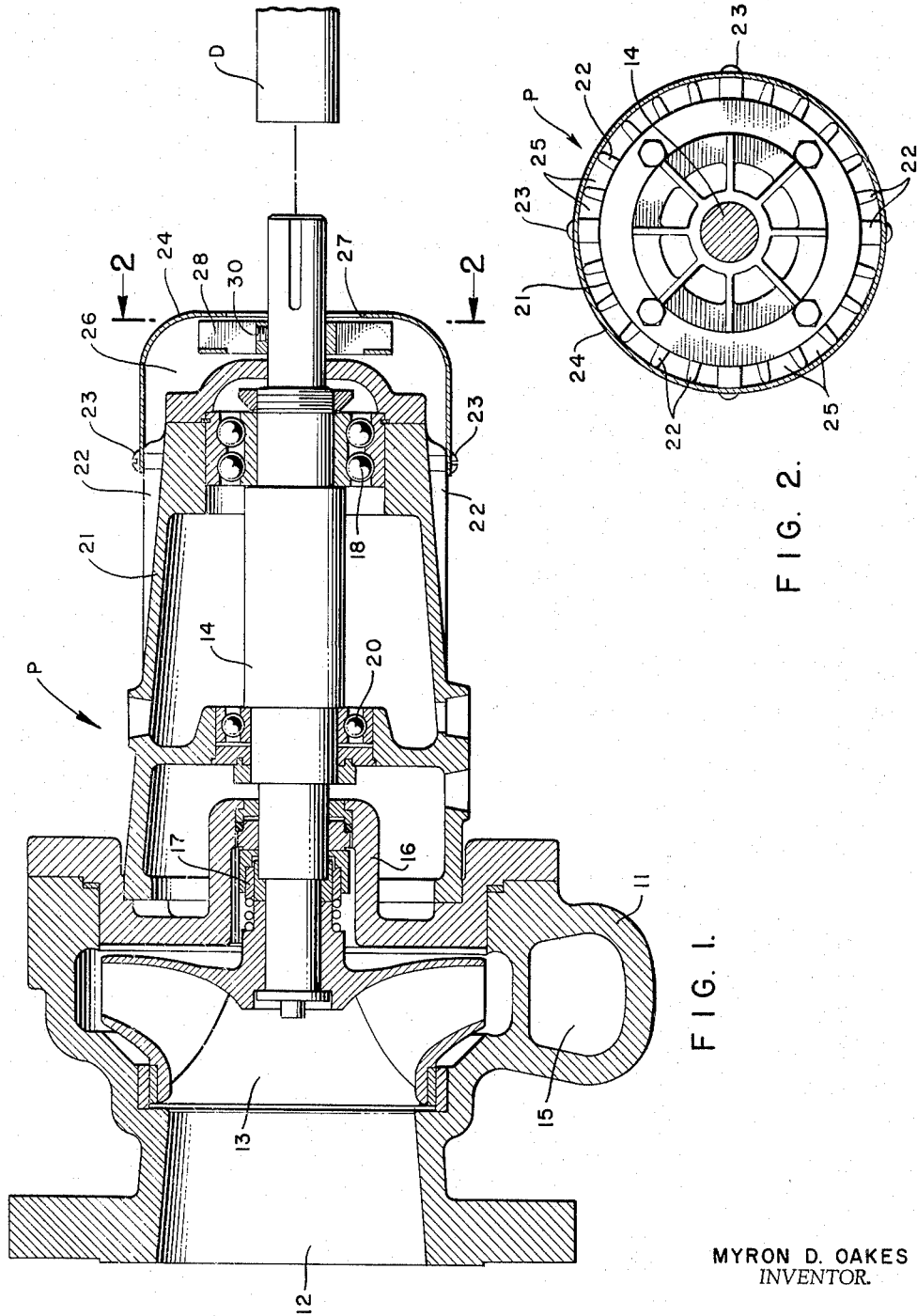

3,217,656
AIR COOLED BEARING HOUSING
Myron D. Oakes, Whittier, Calif., assignor to Borg-Warner Corporation, Chicago, Ill., a corporation of Illinois
Continuation of abandoned application Ser. No. 74,534, Dec. 8, 1960. This application Oct. 2, 1963, Ser. No. 315,113
3 Claims. (Cl. 103—111)

This is a continuation of my application No. 74,534, filed December 8, 1960, having the same title, now abandoned.

This invention relates, in general, to pumps, and, in particular, to an improved means for cooling the bearing housing of pumps.

Heretofore, it has been the practice in pumps adapted to operate at relatively high speeds to provide a water jacket through which water is circulated to maintain the bearings at a predetermined temperature to prevent the breakdown of lubrication and the like. This water jacket surrounding the bearing housing is normally connected to a series of pipes so that water is circulated through the jacket as a continuous uninterrupted flow.

This means of cooling the pump bearings is found to be deficient for several reasons. It is common, for example, in certain industries to have 500 such water cooled pumps operating to perform certain operating procedures each of which utilize approximately 5 gallons per minute of water. Obviously, such a large use of water is quite expensive especially when considered in connection with and added to such other costly features as the cost of such jackets and piping as well as the maintenance thereof.

Obviously, the cost of cleaning of jackets and piping of contamination, mineral deposits, algae and the like runs quite expensive and the only other alternative is to purify the water used—also quite expensive. Too, in such areas as Canada, the problem of frost and freezing exists or in other areas such as the Gulf Coast area where the problem of humidity exists, problems of freezing and sweating of the inside of the bearing housing must be overcome.

Accordingly, it is a principal object of this invention to solve the above difficulties attendant with water cooling of pump bearing housings.

Briefly, the principal object is accomplished by the provision of a pump with a bearing housing so constructed and arranged to cooperate with a cover which encloses an air impeller. Upon rotation of the shaft journaled in bearings of the bearing housing, the air impeller directs air out along the inner side of the cover and the outside of the bearing housing thereby maintaining the bearing housing air cooled. The bearing housing is also provided with fins or ribs spaced circumferentially around the housing and coaxial with the shaft so that the air is more evenly distributed and more surface is provided to be cooled by the air.

Accordingly, a specific object of this invention is the provision of an air cooled bearing housing through which air is circulated in response to rotation of the shaft whereby air is circulated to cool the bearing housing.

These and other objects of the invention will become apparent from the following description when taken in connection with the accompanying drawings in which:

FIG. 1 is a side elevational view partly in section illustrating to advantage the means for cooling the bearing housing constructed in accordance with the teachings of this invention; and FIG. 2 is an end view taken along line 2—2 of FIG. 1, looking in the direction of the arrows, and illustrating to advantage the ribs or fins for the circulation of the air about the bearing housing.

Turning now more specifically to the drawings, it can be seen that there is therein illustrated a centrifugal pump illustrated in its entirety as P having a two-part housing 11 formed with an inlet 12 and an outlet (not shown) and in which is disposed a centrifugal impeller 13 mounted on a rotatable shaft 14. A driver D of any convenient type is normally connected to rotate shaft 14. As is conventional, rotation of the centrifugal impeller 13 will cause fluid entering the inlet 12 to be pumped out the impeller into the volute 15 and thence out the outlet. The two-part housing 11 is also provided with a seal housing 16 in which is disposed sealing means 17 of any suitable type to prevent the leakage of fluid from the impeller along the shaft 14.

As illustrated, the shaft 14 is journaled in radial and thrust bearings, such as the double roller thrust bearings 18 and the single roller radial bearings 20, both of which are disposed in a suitable bearing housing 21.

As heretofore mentioned, an important feature of this invention is the provision of means for cooling the bearing housing 21 in which is located the thrust and radial bearings 18 and 20. This feature will now be explained.

The bearing housing 21 is provided with a plurality of axially disposed radially outwardly extending ribs or fins 22 disposed circumferentially about the bearing housing. As shown, the outer periphery of the bearing housing is tapered with its smallest diameter the greatest distance from the pump housing 11 and the ribs 22 are higher at a point most remote from the impeller 13 to conform with the taper of the housing as illustrated. As more clearly shown in FIG. 2 in the embodiment illustrated, four of the ribs are formed slightly thicker than the other ribs so that bolt means 23 secured thereinto will support a cup-like cover 24 of relatively thin material. Cup 24 is so disposed to telescope a portion of the bearing housing 21 and is spaced from the housing by the ribs 22 so as to provide a space or clearance 25 which defines an air outlet for air in the cup cavity 26 formed by the inside of the cup, and the outside of the bearing housing. The cup is also formed with a centrally located aperture 27 through which the shaft 14 extends, as illustrated in FIG. 1, to provide a sufficient clearance for an air inlet between the periphery of the shaft 14 for the introduction of air into the cavity 26.

An air impeller 28 is fixed on the shaft 14 to rotate therewith by any suitable means such as screw 30 so that air entering the inlet 27 will be impelled by the impeller out the air outlet 25 between the housing and cover 24.

Thus, it can be seen from the above description that upon rotation of the shaft 14 by driver D, air will be directed over the bearing housing. The ribs 22 not only define the air outlet, but also provide a greater surface area subjected to cooling by the air flow. This air flow continuously cools the bearing housing to maintain the temperature range most advantageous for optimum life of bearing lubrication and as previously noted in the embodiment disclosed, both bearings, radial or thrust, are cooled without necessitating a plurality of cooling means for each bearing as heretofore resuired.

While the various parts herein have been described as upper and lower or in a right or left position, such description refers only to the relative position of the parts as shown in the drawings and is not intended to be a limitation of the invention; it being understood that the appended claims should be construed as broadly as the prior art will permit.

I claim:

1. In a centrifugal pump having a pump housing, fluid inlet means and fluid outlet means for said housing, said pump housing providing a shaft opening through a wall thereof, a rotary shaft extending through said opening and projecting for a substantial distance to one side of said pump housing, means sealing said shaft in said opening, an impeller mounted on said shaft and positioned inside of said pump housing for impelling fluid from said inlet means to said outlet means, a bearing housing mounted on the outside of said pump housing and enclosing a portion of said shaft that projects to one side of said pump housing, said bearing housing having an end remote from said pump housing, first shaft bearing means supported by and in said bearing housing adjacent to said opening, and second shaft bearing means supported by and in said housing and spaced axially from said first bearing means in a direction away from said opening, the combination of a plurality of axially disposed, radially outwardly extending, ribs disposed circumferentially about the exterior of said bearing housing, each of said ribs extending substantially parallel to said shaft and having one end adjacent to said first bearing means and the other end adjacent to said second bearing means, a cup-like cover disposed over the end of said bearing housing remote from said pump housing, said cover being supported by said ribs and providing with said ribs and portions of said bearing housing adjacent to said ribs a plurality of spaces defining air outlets for said cover, said cover having a central aperture through which said shaft extends, air inlet means in said cover adjacent said shaft, an air impeller mounted on said shaft within said cover and adjacent to said air inlet means for drawing outside air through said air inlet means and flowing it over the end of said bearing housing beneath said cover, out of said outlets, and over said ribs and the exterior portions of said housing adjacent to said ribs for cooling said bearing housing and both of said bearing means, and means for coupling said shaft to a driver.

2. In a centrifugal pump having a pump housing, fluid inlet means and fluid outlet means for said housing, said pump housing providing a shaft opening through a wall thereof, a rotary shaft extending through said opening and projecting for a substantial distance to one side of said pump housing, means sealing said shaft in said opening, an impeller mounted on said shaft and positioned inside of said pump housing for impelling fluid from said inlet means to said outlet means, a bearing housing mounted on the outside of said pump housing and enclosing a portion of said shaft that projects to one side of said pump housing, said bearing housing having an end remote from said pump housing, radial bearing means for said shaft supported by and in said bearing housing adjacent to said opening, and thrust bearing means for said shaft supported by and in said housing and spaced axially from said radial bearing means in a direction away from said opening, the combination of a plurality of axially disposed, radially outwardly extending, ribs disposed circumferentially about the exterior of said bearing housing, each of said ribs extending substantially parallel to said shaft and having one end adjacent to said radial bearing means and the other end adjacent to said thrust bearing means, a cup-like cover disposed over the end of said bearing housing remote from said pump housing, said cover terminating at and being supported by the ends of said ribs that are adjacent to said thrust bearing means and providing with said ribs and portions of said bearing housing adjacent to said ribs a plurality of spaces defining air outlets for said cover, said cover having a central aperture through which said shaft extends with clearance so as to provide air inlet means in said cover adjacent said shaft, an air impeller mounted on said shaft within said cover and adjacent to said air inlet means for drawing outside air through said air inlet means and flowing it over the end of said bearing housing beneath said cover, out of said outlets, and over said ribs and the exterior portions of said housing adjacent to said ribs for cooling said bearing housing and both of said bearing means, and means for coupling said shaft to a driver.

3. In a centrifugal pump having a pump housing, fluid inlet means and fluid outlet means for said housing, said pump housing providing a shaft opening through a wall thereof, a rotary shaft extending through said opening and projecting for a substantial distance to one side of said pump housing, means sealing said shaft in said opening, an impeller mounted on said shaft and positioned inside of said pump housing for impelling fluid from said inlet means to said outlet means, a bearing housing mounted on the outside of said pump housing and enclosing a portion of said shaft that projects to one side of said pump housing, said bearing housing having an end remote from said pump housing, and shaft bearing means supported by and in said bearing housing, the combination of a plurality of axially disposed, radially outwardly extending, ribs disposed circumferentially about the exterior of said bearing housing, each of said ribs extending substantially parallel to said shaft and having a portion adjacent to said bearing means, a cup-like cover disposed over the end of said bearing housing remote from said pump housing, said cover being supported by said ribs and providing with said ribs and portions of said bearing housing adjacent to said ribs a plurality of spaces defining air outlets for said cover, said cover having a central aperture through which said shaft extends, air inlet means in said cover adjacent said shaft, an air impeller mounted on said shaft within said cover and adjacent to said air inlet means for drawing outside air through said air inlet means and flowing it over the end of said bearing housing beneath said cover, out of said outlets, and over said ribs and the exterior portions of said housing adjacent to said ribs for cooling said bearing housing and said bearing means, and means for coupling said shaft to a driver.

References Cited by the Examiner
UNITED STATES PATENTS

| | | | |
|---|---|---|---|
| 2,735,027 | 2/1956 | Formhals | 308—77 |
| 2,777,395 | 1/1957 | Disbrow. | |
| 2,922,098 | 1/1958 | Hutson | 310—52 |

ROBERT C. RIORDON, *Primary Examiner.*

FRANK SUSKO, *Examiner.*